(12) United States Patent
Orr

(10) Patent No.: US 7,649,183 B2
(45) Date of Patent: Jan. 19, 2010

(54) APPARATUS FOR MONITORING AN ITEM FOR RADIOACTIVE MATERIAL ON OR ASSOCIATED WITH THE ITEM

(75) Inventor: Christopher Henry Orr, Seascale (GB)

(73) Assignee: VT Nuclear Services Limited, Southampton, Hampshire (GB)

( * ) Notice: Subject to any disclaimer, the term of this patent is extended or adjusted under 35 U.S.C. 154(b) by 248 days.

(21) Appl. No.: 11/720,182

(22) PCT Filed: Nov. 28, 2005

(86) PCT No.: PCT/GB2005/004549

§ 371 (c)(1),
(2), (4) Date: Nov. 16, 2007

(87) PCT Pub. No.: WO2006/059077

PCT Pub. Date: Jun. 8, 2006

(65) Prior Publication Data

US 2008/0302973 A1    Dec. 11, 2008

(30) Foreign Application Priority Data

Dec. 1, 2004    (GB) ................................. 0426355.4

(51) Int. Cl.
| | |
|---|---|
| *G01N 21/01* | (2006.01) |
| *G01N 21/51* | (2006.01) |
| *G01N 23/10* | (2006.01) |
| *G01N 23/12* | (2006.01) |

(52) U.S. Cl. .................. 250/428; 250/374; 250/375; 250/376; 250/487; 250/505.1; 250/390.01; 250/385.1; 250/361 R; 250/394

(58) Field of Classification Search ................. 250/428, 250/374–376, 487, 505.1, 395, 390.01, 385.1, 250/361 R, 394
See application file for complete search history.

(56) References Cited

U.S. PATENT DOCUMENTS 4,264,816 A    4/1981    Walenta (Continued)

FOREIGN PATENT DOCUMENTS

DE    28 35 470 A1    2/1980

(Continued)

OTHER PUBLICATIONS

Duncan MacArthur, et al., *Monitoring Pipes for Residual Alpha Contamination*, Spectrum Conference, Seattle, Washington, 1996.

(Continued)

*Primary Examiner*—Bernard E Souw
*Assistant Examiner*—Meenakshi S Sahu
(74) *Attorney, Agent, or Firm*—Workman Nydegger

(57) ABSTRACT

Method and apparatus is provided for monitoring an item for radioactive material on or associated with the item, the apparatus including an enclosed volume, an item monitoring location, a detection location, ion detectors provided within the detection location, a mover of gas for providing a flow of gas past the item monitoring location to a detection location, so as to revel the level and/or presence of radioactive material on the item. The item may be supported within the monitoring location by one or more rollers to ease its insertion and/or removal. The item monitoring location may be extremely elongate so as to measure pipes and the like. Various designs of roller and gas flow controllers are provided to optimize monitoring.

27 Claims, 7 Drawing Sheets

U.S. PATENT DOCUMENTS

| | | | |
|---|---|---|---|
| 4,267,446 A | 5/1981 | Brown et al. |
| 4,426,580 A | 1/1984 | Smith |
| 4,451,736 A | 5/1984 | Cameron |
| 4,740,730 A | 4/1988 | Uda et al. |
| 4,788,430 A | 11/1988 | Gonthier |
| 4,814,608 A | 3/1989 | Dempsey et al. |
| 4,853,536 A | 8/1989 | Dempsey et al. |
| 4,859,854 A | 8/1989 | Kershner et al. |
| 4,926,053 A | 5/1990 | Dempsey et al. |
| 4,970,391 A | 11/1990 | Uber, III |
| 4,992,658 A | 2/1991 | Ramsey et al. |
| 5,008,540 A | 4/1991 | Dempsey |
| 5,053,624 A | 10/1991 | Kronenberg |
| 5,055,674 A | 10/1991 | Kotrappa |
| 5,059,803 A | 10/1991 | Kronenberg |
| 5,107,108 A | 4/1992 | Ramsey et al. |
| 5,126,567 A | 6/1992 | Dempsey et al. |
| 5,128,540 A | 7/1992 | Stieff |
| 5,184,019 A | 2/1993 | MacArthur et al. |
| 5,187,370 A | 2/1993 | MacArthur et al. |
| 5,194,737 A | 3/1993 | MacArthur et al. |
| 5,281,824 A | 1/1994 | MacArthur et al. |
| 5,311,025 A | 5/1994 | MacArthur et al. |
| 5,371,363 A | 12/1994 | Lilimpakis |
| 5,426,305 A | 6/1995 | Siebentritt, Jr. et al. |
| 5,514,872 A | 5/1996 | Bolton et al. |
| 5,525,804 A | 6/1996 | MacArthur et al. |
| 5,539,208 A | 7/1996 | Overhoff |
| 5,550,381 A | 8/1996 | Bolton et al. |
| 5,663,567 A | 9/1997 | Steadman et al. |
| 5,679,958 A | 10/1997 | MacArthur |
| 5,877,502 A | 3/1999 | Koster et al. |
| 6,326,626 B1 | 12/2001 | Orr et al. |
| 6,331,706 B1 | 12/2001 | Orr et al. |
| 6,331,707 B1 | 12/2001 | Orr et al. |
| 6,353,230 B1 * | 3/2002 | Orr et al. ............... 250/394 |
| 6,359,280 B1 | 3/2002 | Orr et al. |
| 6,365,901 B1 | 4/2002 | Orr et al. |
| 6,426,626 B1 | 7/2002 | Kravis |
| 6,455,859 B1 | 9/2002 | Orr et al. |
| 6,649,916 B2 | 11/2003 | Orr et al. |
| 6,717,153 B2 | 4/2004 | Gunn et al. |
| 6,822,238 B2 * | 11/2004 | Orr et al. ............... 250/374 |
| 2002/0190217 A1 | 12/2002 | Orr |

FOREIGN PATENT DOCUMENTS

| | | |
|---|---|---|
| GB | 0 857 005 | 2/1959 |
| GB | 1 090 745 | 3/1965 |
| GB | 2 301 222 | 11/1996 |
| GB | 2 202 369 A1 | 9/1998 |
| GB | 2 337 108 A1 | 11/1999 |
| GB | 2 337 109 A1 | 11/1999 |
| GB | 2 337 110 A1 | 11/1999 |
| GB | 2 337 153 A1 | 11/1999 |
| GB | 2 337 155 A1 | 11/1999 |
| GB | 2 337 156 A1 | 11/1999 |
| GB | 2 338 060 A | 12/1999 |
| GB | 2 373 325 A | 9/2002 |
| JP | 59-137875 | 8/1984 |
| JP | 61-265593 | 11/1986 |
| WO | WO 97/45754 | 12/1997 |
| WO | WO 98/38531 | 9/1998 |

OTHER PUBLICATIONS

Advertisement, *Electret Ion Chambers for Alpha Measurements*, Rad Elec Inc., 1998.

Advertisement, *Electret Ion Chambers for Tritium Measurements*,, Rad Elec Inc., 1998.

Advertisement, *Electret Ion Chambers for Environmental Gamma*, Rad Elec Inc., 1998.

Advertisement, *Electret Ion Chambers for Radon & Thoron*, Rad Elec Inc., 1998.

Rad Elec Inc., <http://www.radelec.com>, 20 pages, visted on Jan. 21, 1998.

P. Kotrappa, et al., *Ion Transfer Electret Ion Chambers to Measure Alpha Surface Contamination Inside Pipers*, Health Physics Society Annual Meeting, San Antonio, Texas, Jun. 29-Jul. 3, 1997.

J. Clark, *Electret Ion Chambers (EIC) for Measuring Dose Equivalents in Mixed Fields of Thermal Neutrons, Fast Neutrons and Gamma Radiation*, Health Physics Society Annual Meeting, San Antonio, Texas, Jun. 29-Jul. 3, 1997.

L'Annunziata, *Handbook of Radioactivity Analysis*, Academic Press, ISBN 0-120436559, Aug. 1998, p. 157.

G. Muller et al., *Low-background Counting Using Ge(Li) Detectors with Anti-muon-shields*, Nuclear Instruments and Methods in Physics Research A295, May 9, 1990, pp. 133-139.

* cited by examiner

APPARATUS FOR MONITORING AN ITEM FOR RADIOACTIVE MATERIAL ON OR ASSOCIATED WITH THE ITEM

BACKGROUND OF THE INVENTION

1. Field of the Invention

This invention concerns improvements in and relating to monitoring of items, particularly, but not exclusively, the monitoring of radioactive emissions arising from elongate items such as pipe sections.

2. Present State of the Art

The technique described in WO98/38531 is useful for establishing the radioactive emission sources associated with different surfaces of an elongate item, such as a pipe section. It does so by placing the item in a chamber, moving air past the item and detecting ions. The ions are generated in the air when it is close to the item by the passage of emissions, predominantly alpha emissions, arising from radioactive sources associated with the item. An item is introduced into the chamber by opening one of the long walls of the chamber and lowering the item into the chamber, in a direction generally perpendicular to the item's axis. The item is mounted on a cradle and the chamber is then shut.

Problems with this approach arise from the difficulties in manoeuvring an elongate item in this way. These may include the time required and/or the risk of damage to the instrument through such an approach.

SUMMARY OF THE INVENTION

The present invention has amongst its potential aims to provide an instrument into and from which items can be more easily manoeuvred. The present invention has amongst its potential aims quick and/or accurate monitoring of items for radioactive sources.

According to a first aspect of the invention we provide apparatus for monitoring an item for radioactive material on or associated with the item, the apparatus comprising an enclosed volume, the enclosed volume including an item monitoring location and a detection location, the detection location including ion detectors, a mover of gas for providing a flow of gas past the item monitoring location to the detection location, wherein the enclosed volume has a length extending from one end to the other, the length is considered perpendicular to a width, the length is at least 5 times the width, the item is introduced to the item monitoring location through a closeable opening and the closeable opening is provided at one end of the enclosed volume.

According to a second aspect of the invention we provide a method of monitoring an item for radioactive material on or associated with the item, the method including:

providing an enclosed volume, the enclosed volume having a length extending from one end to the other, the length being considered perpendicular to a width, the length being at least 5 times the width;

introducing the item to the item monitoring location through a closeable opening provided at one end of the enclosed volume;

moving gas in the enclosed volume past the item monitoring location to a detection location;

detecting ions in the gas using the detectors at the detecting location.

According to a third aspect of the invention we provide apparatus for monitoring an item for radioactive material on or associated with the item, the apparatus comprising an enclosed volume, the enclosed volume including an item monitoring location and a detection location, the detection location including ion detectors, a mover of gas for providing a flow of gas past the item monitoring location to the detection location, wherein an item support system is provided at the item monitoring location, the item support system including one or more rollers.

According to a fourth aspect of the invention we provide a method of monitoring an item for radioactive material on or associated with the item, the method including: providing an enclosed volume, introducing an item through a closeable opening in one end of the chamber to provide the item at an item monitoring location; moving gas in the enclosed volume past the item monitoring location to a detection location; detecting ions in the gas using the detectors at the detecting location; wherein the item is moved to the item monitoring location on a support system including one or more rollers, the detection for ions in the medium is performed whilst the item is on the same support system.

According to a fifth aspect of the invention we provide apparatus for monitoring an item for radioactive material on or associated with the item, the apparatus comprising an enclosed volume, the enclosed volume including an item monitoring location and a detection location, the detection location including ion detectors, a mover of gas for providing a flow of gas past the item monitoring location to the detection location, wherein one or more gas flow controllers are provided within the enclosed volume.

According to a sixth aspect of the invention we provide a method of monitoring an item for radioactive material on or associated with the item, the method including: providing an enclosed volume, providing an item at an item monitoring location; moving gas in the enclosed volume past the item monitoring location to a detection location; detecting ions in the gas using the detectors at the detecting location; wherein the gas flow within the enclosed volume is controller using one or more gas flow controllers.

According to a seventh aspect of the invention we provide apparatus for monitoring an item for radioactive material on or associated with the item, the apparatus comprising an enclosed volume, the enclosed volume including an item monitoring location and a detection location, the detection location including ion detectors, a mover of gas for providing a flow of gas past the item monitoring location to the detection location, wherein the enclosed volume is formed by joining a plurality of sections together, the sections including a first section having a gas inlet to the enclosed volume and a second section having a gas outlet from the enclosed volume and one or more optional third sections for linking the first section to the second section.

According to an eighth aspect of the invention we provide a method of monitoring an item for radioactive material on or associated with the item, the method including: providing an enclosed volume, providing an item at an item monitoring location; moving gas in the enclosed volume past the item monitoring location to a detection location; detecting ions in the gas using the detectors at the detecting location; wherein the enclosed volume is formed by joining a plurality of sections together, the sections including a first section having a gas inlet to the enclosed volume and a second section having a gas outlet from the enclosed volume and a number of third sections for linking the first section to the second section and providing an enclosed volume longer than the item.

According to a ninth aspect of the invention we provide apparatus for monitoring an item for radioactive material on or associated with the item, the apparatus comprising an enclosed volume, the enclosed volume including an item monitoring location and a detection location, the detection location including ion detectors, a mover of gas for providing a flow of gas from an inlet past the item monitoring location and to an outlet, the gas being returned from the outlet to the inlet by a return passage, the return passage including one or more of the mover of gas, the detection location, an ion filter.

According to a tenth aspect of the invention we provide a method of monitoring an item for radioactive material on or associated with the item, the method including: providing an enclosed volume, providing an item at an item monitoring location; moving gas in the enclosed volume from an inlet past the item monitoring location and to an outlet; wherein the gas flows from the outlet to the inlet along a return passage, the gas passing through the detection location and/or mover of gas and/or an ion filter during its flow along the return passage.

The various aspects of the present invention may include one or more of the following features, options or possibilities.

The item may be an elongate item, such as a pipe, rail, I-beam or the like. An elongate item may be one whose greatest dimension, designated length, is 10 times its smallest dimension, designated width. The item may be a pipe used in the oil industry, particularly the oil extraction industrial, for instance a part of a drill.

The item may be moved to the monitoring location along an axis, particularly its longest axis. The item is preferably removed from the monitoring location along the same axis, but preferably in the opposition direction.

The radioactive material may be an alpha and/or beta emitter. The radioactive material may be on the surface of the item and/or on or in material on the surface of the item.

The enclosed volume may be elongate. The enclosed volume may be 10 times or more as long as it is wide and/or tall. The enclosed volume may have an axis, preferably the long axis. The opening is preferably provided at one end of the enclosed volume, ideally at the end of the elongate axis. The opening may be provided with a closure. The closure may be sealable. The closure may be provided with a magnetic closure. The closure may be connected by one or more hinges to the enclosed volume.

The item monitoring location may be provided between a gas inlet to the enclosed volume and the detector. The item monitoring location may be provided between a gas inlet and a gas mover, such as a fan. The gas inlet may be provided in the closure for the opening. The gas inlet may be provided in a part of the enclosed volume other than the closure for the opening. The gas inlet may be provided with filter, ideally an ion filter.

The detection location may include one or more ion detectors. The ion detector may be an electret. The ion detectors may be a plurality of conductors, such as plates, with an electric field provided between them. Alternate conductors with an applied potential and a different potential, such as earthed, may be provided. The electrostatic potential at the detection location may be measured. The current at the detection location may be measured.

The mover of gas may be a fan.

The gas may be air.

Particularly in relation to the first and/or second aspects of the invention, the features, options or possibilities of the following paragraph may be provided. The length may be at least 10 times the width. The length may be at least 20 times the width. Preferably the item is introduced to the enclosed volume along the same axis as the length is considered and/or an axis parallel thereto. The item may be introduced through the same end of the apparatus as the gas enters through. The item may be introduced through the same end of the apparatus as the gas leaves through. The item may be removed through the same end of the apparatus as the gas enters through. The item may be removed through the same end of the apparatus as the gas leaves through. The closeable opening may include the end wall of the enclosed volume. The closeable opening may include at least part of the side wall of the enclosed volume. The closeable opening may be magnetically sealed when closed. The closeable opening may be air tight when closed.

Particularly in relation to the third and/or fourth aspects of the invention, the features, options or possibilities of the following paragraph may be provided. The item support system may be formed of a plurality of components. The components may remain in a fixed position relative to the enclosed volume and/or item during movement of the item. The components may however rotate during movement of the item. The components may be one or more rollers. A component may be formed of one or more rollers. The middle of the component may be lower than the ends of the component, for instance by providing two rollers whose adjoining ends are lower than their distal ends. Rollers in a V-shaped configuration may be provided. One or more of the rollers may be powered. One or more of the rollers may be unpowered. Preferably the separation between one powered roller and the next is less than the length of the item. The support system may be formed of a number of rollers. Two or more rollers may support the item whilst the detection of ions in the medium is performed. Other rollers may assist in supporting the item during its movement to the monitoring location. Preferably the method includes moving the item back out of the enclosed volume after the detection of any ions in the gas has been performed.

Particularly in relation to the fifth and/or sixth aspects of the invention, the features, options or possibilities in the five paragraphs that follow may be provided. One or more gas flow controllers may be provided between a gas entrance to the enclosed volume and the item monitoring location. One or more different types of gas flow controller may be so provided.

A first type of gas flow controller may be provided. The gas flow controller may be in the form of one or more elements, preferably plates. Preferably the gas flow controllers are planar. Preferably the gas flow controllers are parallel to one another. Preferably the gas flow controllers are aligned with an axis of the apparatus, preferably the length thereof. The length may be the longest axis of the apparatus. Gas flow controllers may be provided spanning the width and/or depth of the enclosed volume. Preferably a plurality of gas flow controllers are provided in one orientation and another plurality are provided in another orientation. The orientations may be perpendicular to one another. Preferably the spacing between gas flow controllers is even. The gas flow controllers may be in the form of hollow elements, such as tubes. Preferably a series of hollow elements are provided spanning the chamber. All of the gas flow may pass down the inside of an hollow element and/or between adjoining hollow elements to pass through the gas flow controllers. The hollow elements may be aligned with one another. The hollow elements may be of the same or different cross-sections to one another. The one or more gas flow controllers may straighten the gas flow and/or align the gas flow. The gas flow may be straightened and/or aligned with an axis of the apparatus, particularly the length thereof. The one or more gas flow controllers may provide laminar gas flow in the item monitoring location. The one or more first type gas flow controllers may be provided on the component which closes the closeable opening.

A second type of gas flow controller may be provided. The gas flow controller may be in the form of one or more elements, preferably plates. Preferably the gas flow controllers are planar. Preferably the gas flow controllers are aligned with an axis of the apparatus, preferably perpendicular to the length. Preferably the gas flow controller extends radially inward from the wall or walls defining the enclosed volume. Preferably an aperture is provided in the gas flow controller, preferably centrally provided. The axis of the aperture preferably aligns with the axis of the item. Preferably the aperture has a profile of equivalent shape to the external profile of one or more sections of the item. The aperture may be circular. The one or more gas flow controllers may determine the proportion of the gas flow which passes around the outside of a hollow item and/or through the item. Preferably the portion is greater than 5% in each case, ideally the proportion is 50% in each case. The one or more gas flow controllers may promote gas flow near the surface of the item, particularly the outside surface thereof. One or more of the second type gas flow controllers may be provided on the component which closes the closeable opening. One or more of the second type gas flow controllers may be provided in the item monitoring location, for instance evenly spaced along the direction of gas flow there through and/or evenly spaced along the length thereof.

A third type of gas flow controller may be provided. The gas flow controller may be in the form of one or more elements, preferably plates. Preferably the gas flow controller has a first portion substantially aligned with the direction of gas flow through the inlet to the enclosed volume. Preferably the gas flow controller has a second portion substantially aligned with the axis of the enclosed volume and/or its length and/or the direction of gas flow through the enclosed. Preferably the first portion and second portion are joined by a transition portion which changes alignment from one to the other. The transition portion may be curved. Preferably the third type of gas flow controller promotes flow of the gas along the enclosed volume. One or more of the third type of gas flow controllers may be provided on the component which closes the closeable opening.

One or more gas flow controllers may be provided within the item monitoring location. A fourth type of gas flow controller may be provided as a result. The fourth type may have any of the features, options or possibilities of the second type, and may particularly be for the purposes of promoting gas flow near the surface of the item, particularly the outside surface thereof.

One or more gas flow controllers may be provided within the item monitoring location, to provide a fifth type of gas flow controller as a result. The gas flow controllers may be provided at discrete locations within the item monitoring location. The gas flow controllers may be part of the support system for the item. The gas flow controllers may be part of one or more of the rollers used to support the item. The gas flow controllers may be a part of one or more powered rollers and/or one or more unpowered rollers. Preferably all rollers supporting the item during a measurement are provided with gas flow controllers. The gas flow controllers may be in the form of one or more circular elements, such as discs. Preferably the elements or discs have a radial extent about an axis which is even in all directions in that plane, the axis being the axis of rotation of the roller. A roller may be provided with a plurality of such gas flow controllers, preferably evenly spaced along the axis of rotation. Preferably the gas flow controllers on a roller are of equivalent size. Preferably the gas flow controllers on the different rollers are of equivalent size. The one or more gas flow controllers may facilitate gas flow past the parts of the item close to the support.

Particularly in relation to the seventh and/or eighth aspects of the invention, the features, options or possibilities of the following paragraph may be provided. The first section may include a filter. The first section may include a closeable opening through which the item is introduced and/or removed. The first section may have a corresponding cross-section to the second section and/or third section. The first section may include one or more of one or more of the types of gas flow controller. The first section may be releaseably fastened to a third section. The second section may include the detection location. The second section may include the gas mover. The second location may include a closeable opening through which the item is introduced and/or removed. The second section may have a corresponding cross-section to the first section and/or third section. The second section may include one or more of one or more of the types of gas flow controller. The second section may be releaseably fastened to a third section. One or more third sections may be provided. One of more third sections connected to a further third section may be provided.

Particularly in relation to the ninth and/or tenth aspects of the invention, the features, options or possibilities of the following paragraph may be provided. Preferably the return passage is attached to the side of the enclosed volume. Preferably the outlet from the enclosed volume to the return passage is provided in a side wall of the enclosed volume. Preferably the inlet to the enclosed volume from the return passage is provided in a side wall of the enclosed volume. Preferably the return passage includes the detection location and gas mover. preferably the return passage also includes an ion filter. Preferably the gas in the return passage flows through the detection location, then the gas mover. Preferably the gas then flows through the ion filter. Preferably the gas is then returned to the enclosed volume. Preferably the detection location and/or gas mover and/or ion filter are provided in removable units. Preferably the units slide into and out of the return passage.

One or more detections of any ions in the gas may be performed. Preferably the same item is subjected to at least two detections. Preferably between one detection and another the position of the item within the item monitoring location is changed. The change may be provided by moving the item along the path traveled to move it to the item monitoring location, for instance along the item's axis. More preferably the change is provided by rotating the item, ideally about its axis. A rotation of at least 90° is preferred.

Any of the forms of the inventions set out in this document may be combined with features, options or possibilities from two earlier developments of the applicant detailed in GB2338060 and GB2373325. The closed circuit and background cancelling approaches provided in those documents, the contents of which are incorporated herein by reference are particularly useful.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

Figure 1:
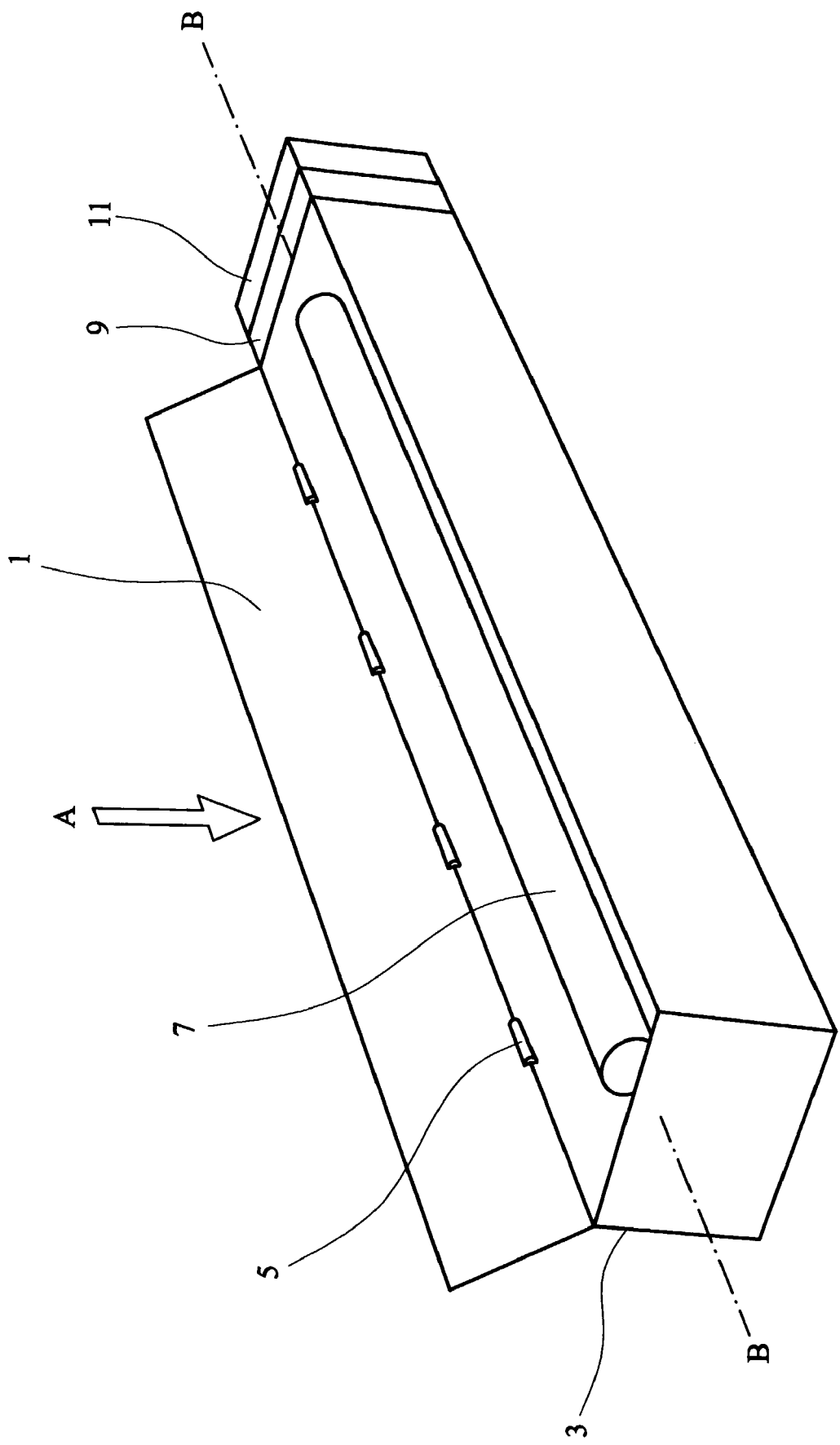
FIG. 1 shows schematically the manner of accessing the chamber and introducing the item in the prior art.

The existing design for monitoring radioactive emission sources associated with pipes and the like is set out in WO98/38531 is effective for determining the location and level of sources present. However, it faces practical difficulties in handling such heavy and elongate items rapidly and without the risk of damage to the instrument. As can be seen in FIG. 1, the top wall 1 of the chamber 3 is opened on hinges 5. This exposes the inside of the chamber 3 and allows the pipe 7 to be lowered in along the direction of arrow A, that is perpendicular to its axis B-B. If the pipe 7 swings or the like, however, it could potentially pierce a wall of the chamber 3 and/or damage the detector array 9 and/or fan assembly 11 and/or damage the seals between sections which form the chamber.

The capability to easily handle elongate and/or heavy items would be particularly useful in the context of verifying that drilling pipes and the like used in the oil industry are free of radioactive emission sources after cleaning. Cleaning may occur before reuse or disposal. As the cleaning process is a hot one, and as the pipes are self drying as a result, a monitoring approach based on the use of detection of ions generated by alpha emissions is a practical one. However, very large numbers of heavy and bulky pipes need to be handled with minimum time and effort.

Figure 2:
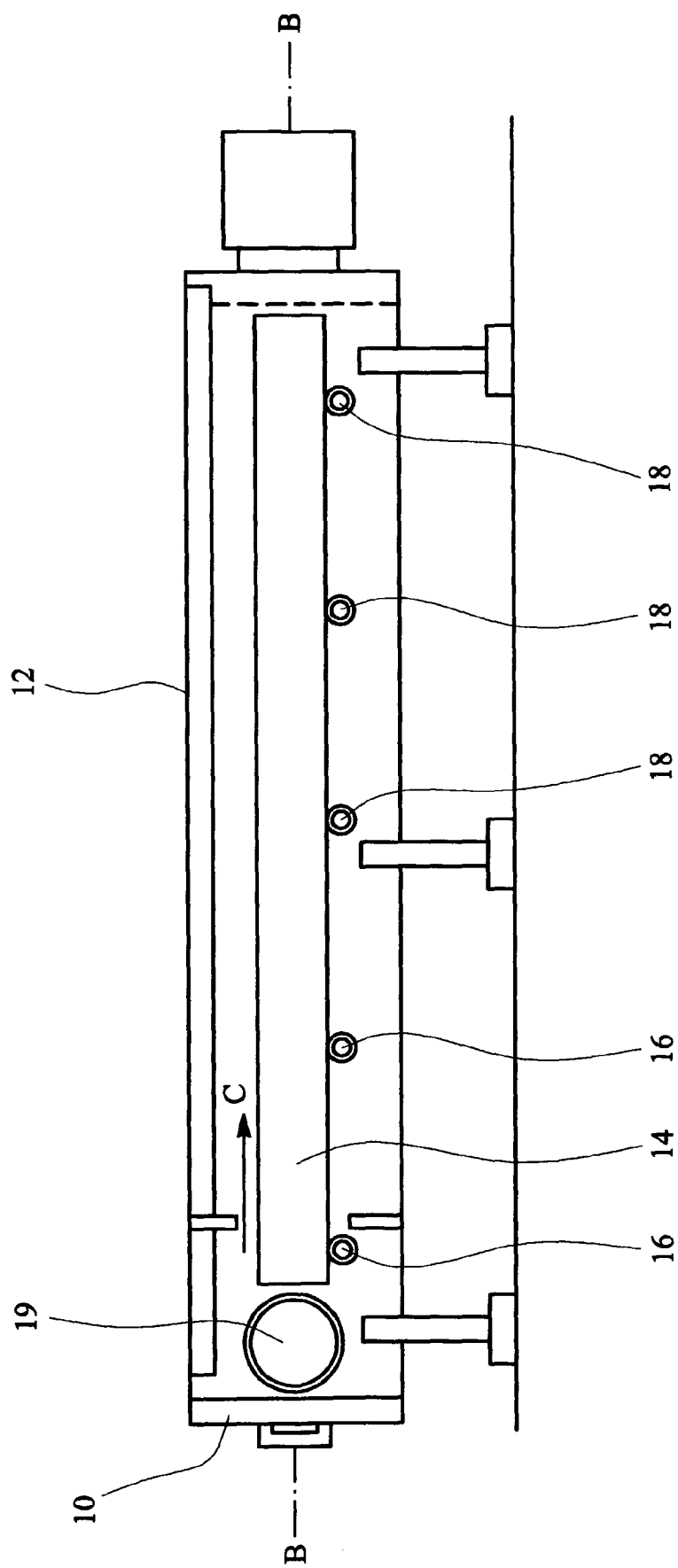
FIG. 2 shows schematically, a side cross-sectional view of an instrument according to one embodiment of the invention.

The improved mechanism for introducing and removing the pipes is illustrated in FIG. 2. In basic terms, the end 10 of the chamber 12 is opened to expose the inside of the chamber 12 and allow the pipe 14 to be inserted in the direction of arrow C, that is along its axis B-B. The pipe 14 is driven into the chamber 12 by one or more powered rollers 16 and is further supported by one or more support rollers 18. To facilitate the opening end 10 for the chamber 12, the air inlet 19 and associated air filter (not shown) has been moved to the side wall. The end 10 is closed before the measurement is performed and is held shut by a magnet to give a seal. Other closure mechanisms are possible, including mechanical closures. Suitable seals are provided between components to maintain a seal between the inside and outside.

Figure 3:
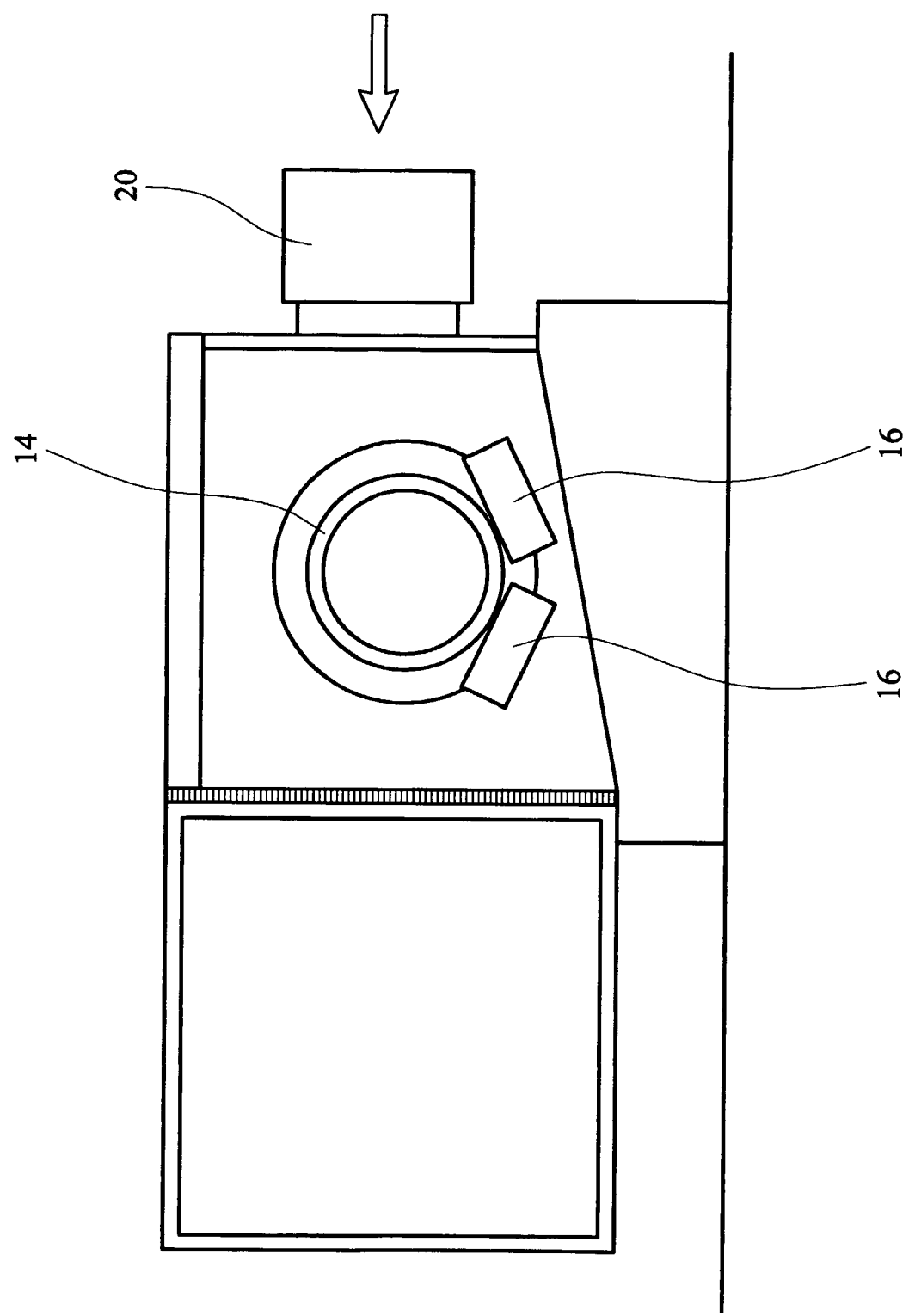
FIG. 3 shows schematically, an end cross-sectional view of the instrument of FIG. 2.
Figure 4:
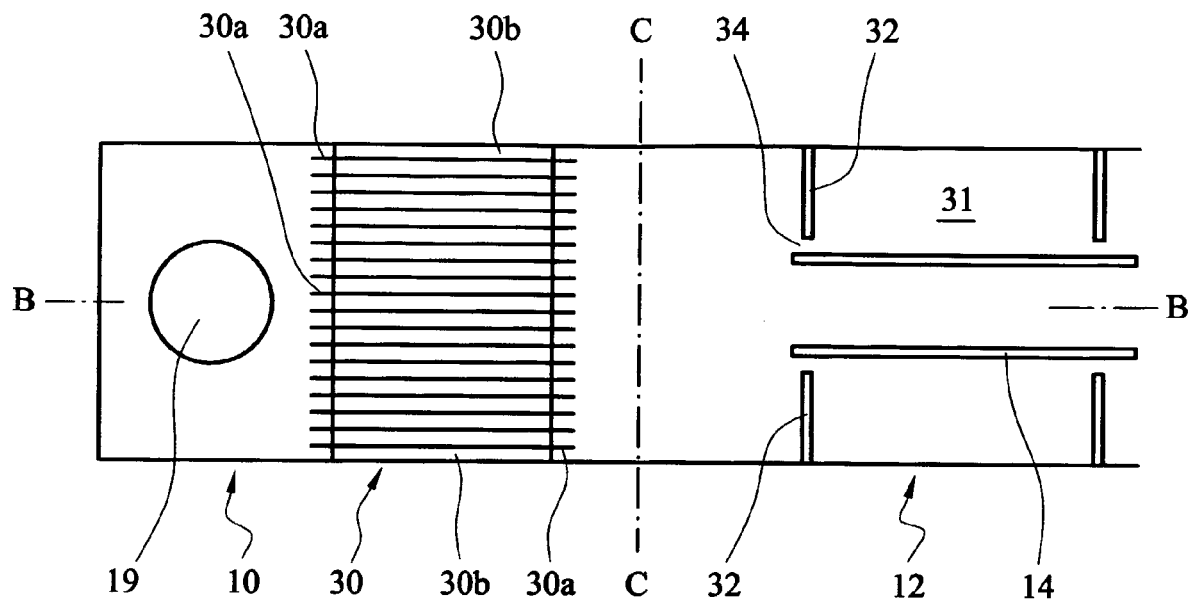
FIG. 4 is a schematic side view of another embodiment of an instrument according to the invention.

As can be seen in the end view of FIG. 3, the powered rollers 16 and support rollers are provided in a V-shaped configuration to assist in maintaining the pipe 14 in position.

If the detection level for sources required is low, then the potential exists to perform the measurement of the sources present in one position and then rotate the pipe 14 about its axis, for instance through 180°, before performing another measurement. In this way, if the source happened to be in contact with the roller in the first position, or if the air flow past the source was disrupted in the first position, then an accurate measurement would still be made in the second position.

The result of the measurement or measurements may be a quantification of the sources present or, more likely, a clean/not clean indication.

Further alternative versions of the invention are shown in FIGS. 4 to 9. Each of these is potentially independently provided relative to the others.

Firstly, a series of air flow straighteners 30 have been provided between the inlet 19, where the air enters the chamber 12, and the start of the location 31 at which the pipe 14 can be present. The air flow straighteners 30 are in the form of a series of horizontally aligned parallel plates 30*a* and a series of vertically aligned parallel plates 30*b* which encourage smooth, straight air flow towards the pipe 14. Uneven airflow may otherwise arise with the side wall positioning of the air inlet. By providing the division between the end 10 and chamber 12 along line C-C, the air flow straighteners 30 are out of the way when the pipe 14 is being loaded or unloaded relative to the instrument.

Secondly, between the inlet 19 and the start of the location 31 at which the pipe 14 can be present, a baffle 32 is provided. The baffle 32 extends from the walls of the chamber 12 towards the axis of the pipe 14. The baffle 32 has a circular aperture 34 therein, centred on the axis B-B of the pipe 14. The baffle 32 is particular to a size of pipe 14; different baffles 32 having different diameter apertures 34 and different centres therefor. The baffle 32 for a pipe 14 is configured such that 50% of the air flow passes through the inside of the pipe 14 and 50% of the air flow passes down the outside of the pipe. In this way a balanced representation of contamination on either surface is provided. Rollers may be provided close to the baffle 32 on either side, so as to accurately support the pipe 14 during movement into and/or out of the chamber 12 through the relatively tight clearance of the aperture 34 in the baffle 32.

Further baffles 36 may be provided at other locations, preferably along the pipe 14, to promote air flow near the outside surface of the pipe 14.

In a further embodiment of the invention, not shown, the horizontal and vertical plates are replaced by a different form of air flow straightener. In this case a bundle of a large number of tubes is provided, with the bundle extending across the width of the chamber and with the passages through the tubes being aligned with the chamber. In this way a large number of straight air flow paths along the chamber can be formed. Such a format of air flow straightener can be used together with a baffle 32 of the type described above.

Figure 5:
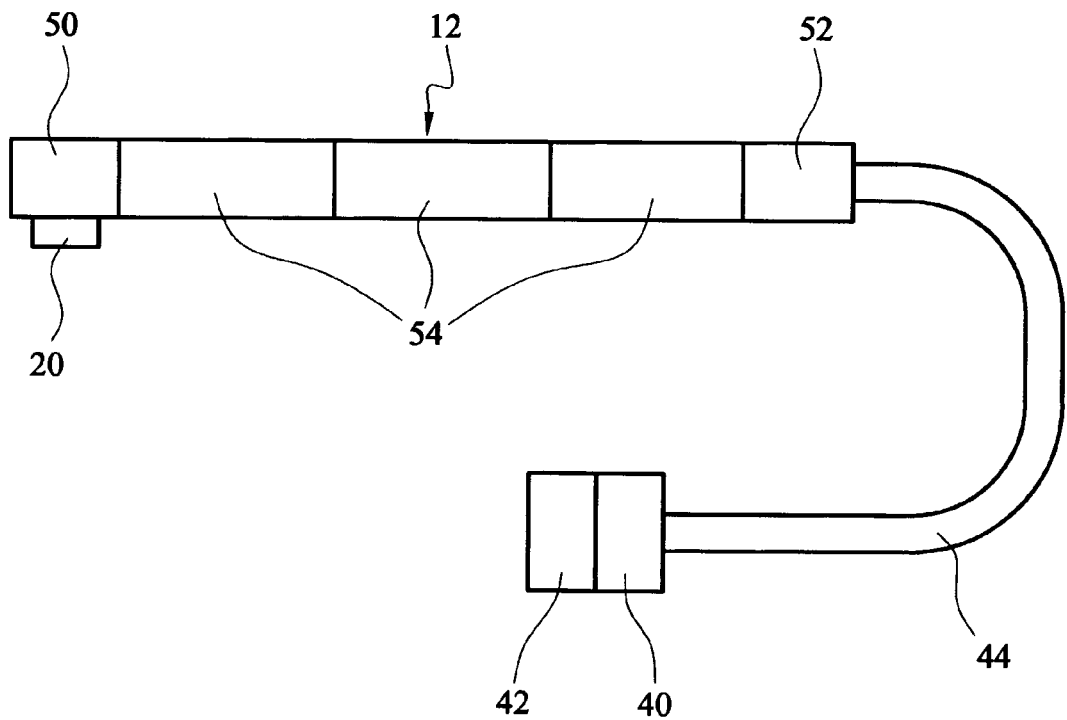
FIG. 5 is a plan schematic view of another embodiment of the invention.

As shown in the further embodiment of FIG. 5, the risk of damage to the detector array 40 and/or fan unit 42 can be further reduced by increasing the separation between them and the pipe containing chamber 12 through the use of a non-plastic flexible coupling tube 44.

Independently of the above possibility, FIG. 5 also shows the manner by which the instrument approach can accommodate a wide variety of different pipe or other item lengths. As well as a door module 50 for one end of the chamber 12 and a connection module 52 for the other end (which links to the tube 44), the instrument can be provided with as many extension modules 54 as it needs in between to accommodate the pipe 14 to be monitored. In this case, three extension modules 54 are used.

Figure 6:
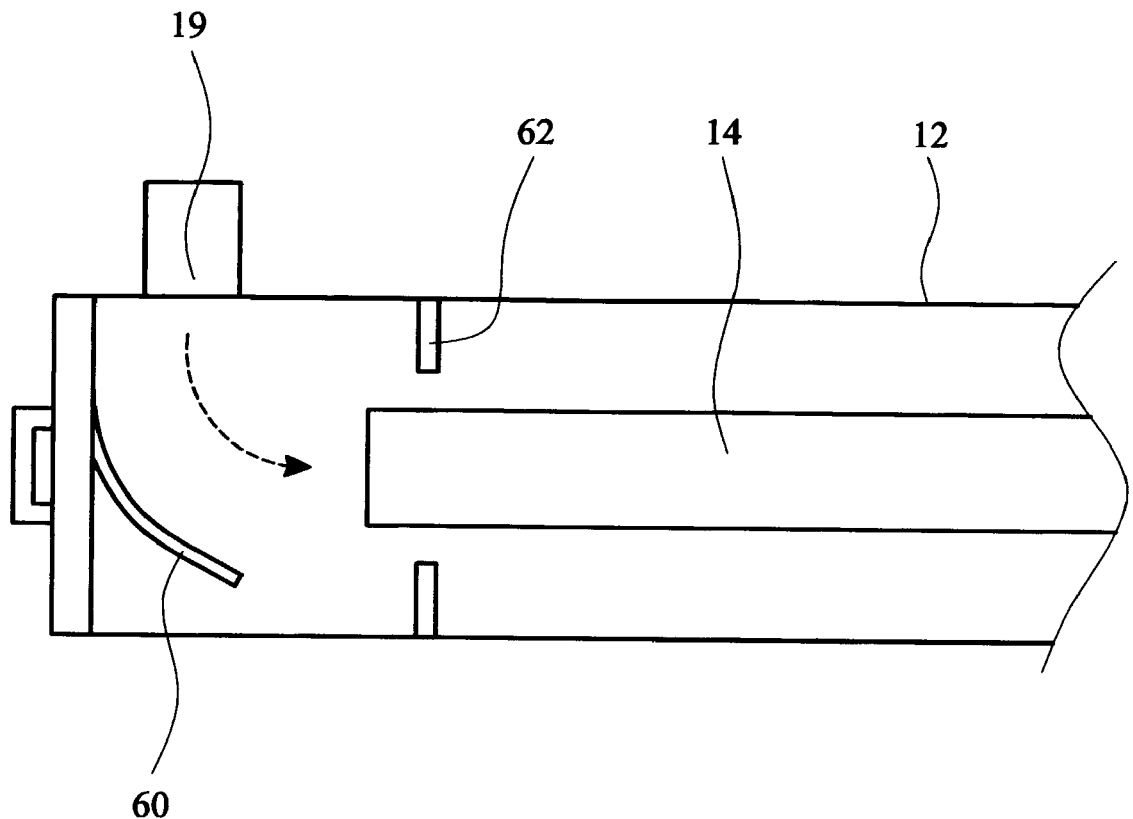
FIG. 6 is a schematic side view of another embodiment of the invention.

FIG. 6 shows a further modification to ensure appropriate air flow relative to the pipe 14. In this case, air passing through the inlet 19 is encouraged by curved baffle 60 to flow towards the pipe 14 in as smooth a manner as possible. Baffle 62 ensures the appropriate portions of the air flow pass through the inside and round the outside of the pipe 14.

Figure 7:
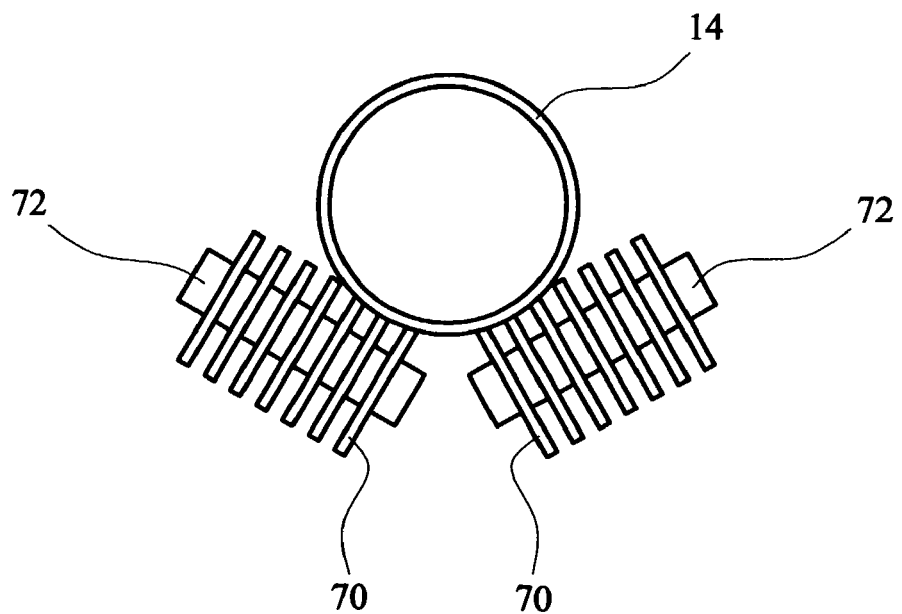
FIG. 7 is an end view of a roller detail according to another embodiment.

FIG. 7 features a modified roller design which is suitable for use both as the power rollers 16 and support rollers 18. To minimise the blind spots in the flow of air past the pipe 14, the rollers are formed from a series of radial discs 70 mounted on a central cylinder 72. Air flow between the discs 70 is provided and so measurement of contamination on those parts of the pipe 14 is possible too. The very small contact area remaining can be checked by rotating the pipe 14 about its axis and making another measurement.

Figure 8:
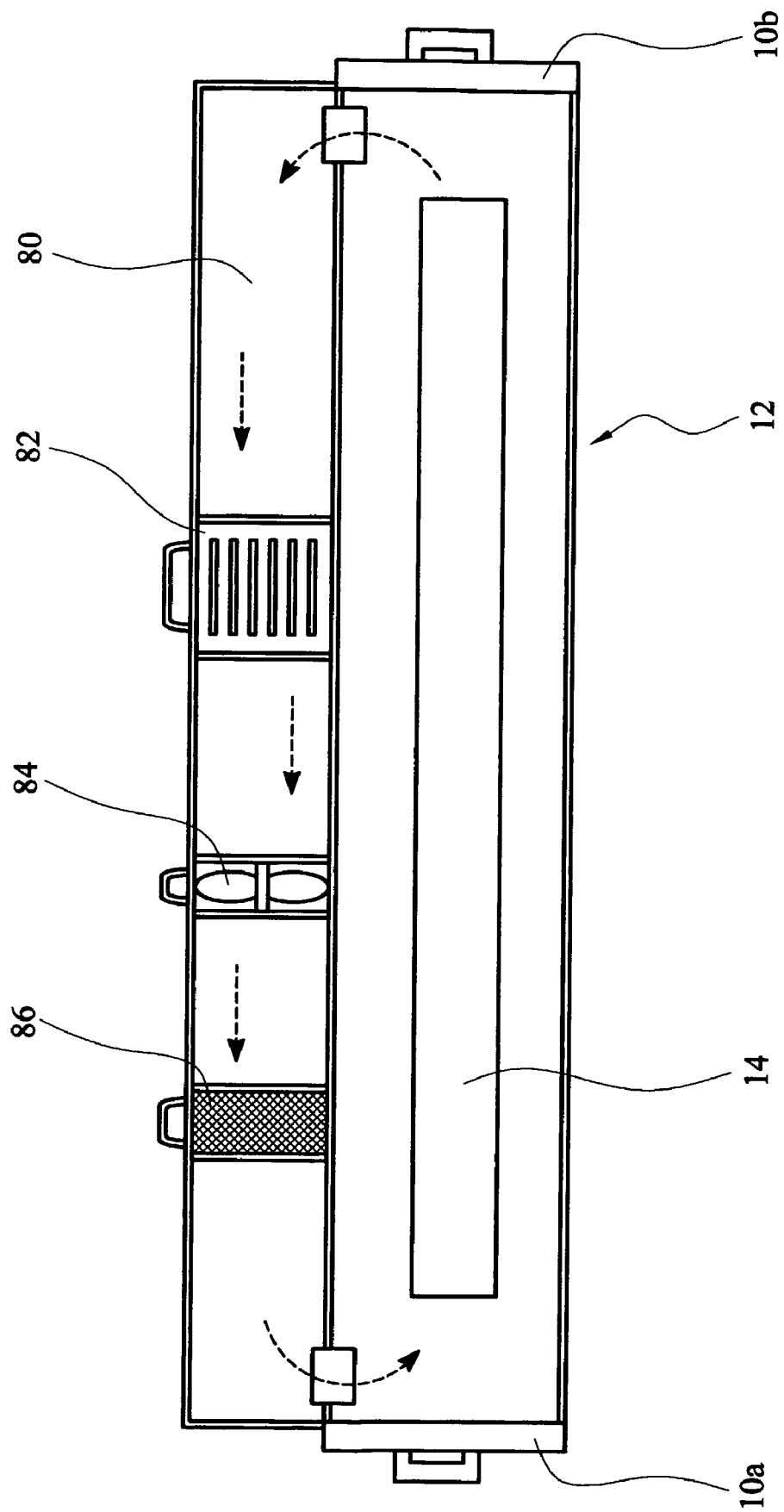
FIG. 8 shows schematically, a side cross-sectional view of an instrument according to another embodiment of the invention.

FIG. 8 illustrates a closed system in which the air is recirculated. This is provided by attaching a return passage 80 to the chamber 12. The passage 80 is connected to the side of the chamber 12 at both ends and so the chamber 12 can be opened at either end. This allows the pipe 14 to go in one end, 10a, and leave via the other, 10b, with potential benefits in terms of handling. The return passage 80 is provided with three locations at which modules can be inserted or removed. A slide in/slide out action is preferred. The locations can accommodate a detector plate module 82, air propelling fan 84 and filter 86 to prevent ion return to the chamber 12.

Figure 9:
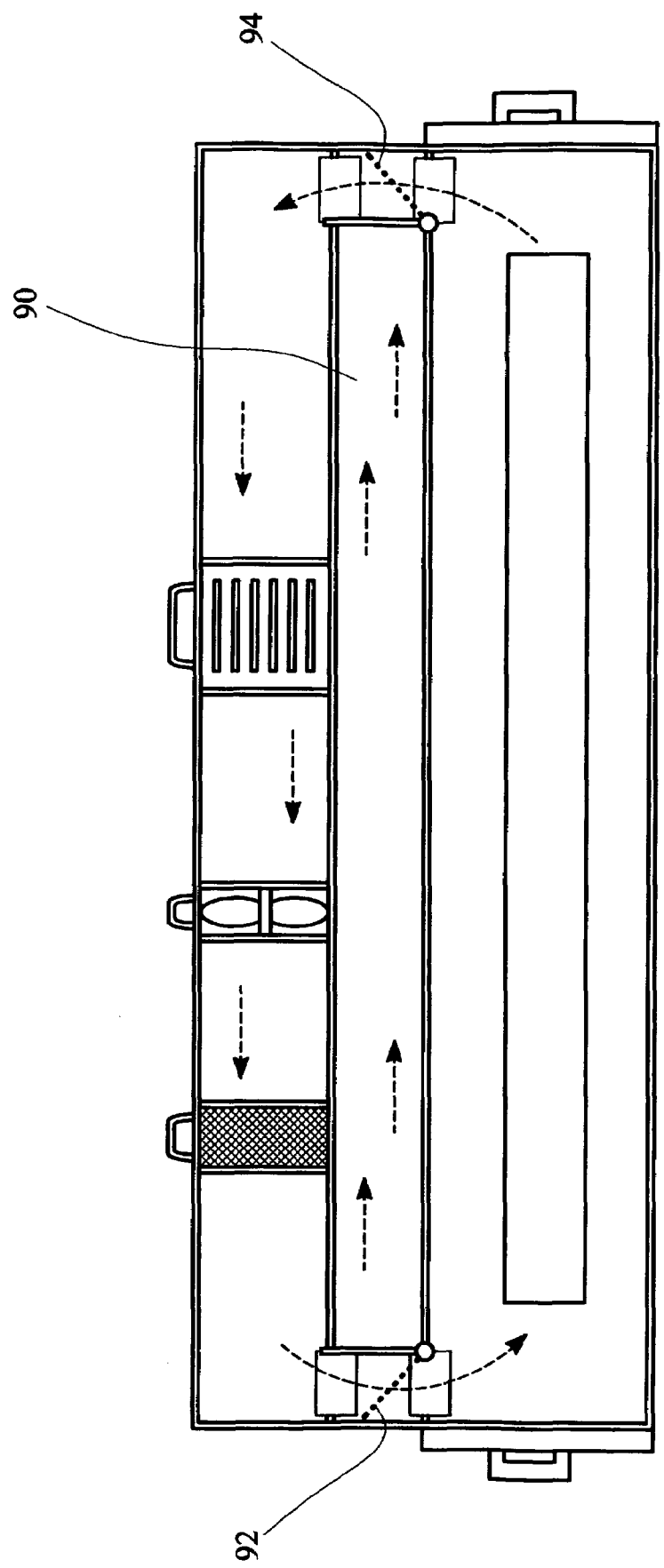
FIG. 9 shows schematically, a side cross-sectional view of an instrument according to another embodiment of the invention.

FIG. 9 illustrates an instrument in which two alternative paths for the air flow are provided. The first is through the chamber 12 as described above, the second is via a clean passage 90. Valves 92 and 94 control the air flow path. When air is circulated through the clean passage 90 and measurements are made, these give an indication of the background level of ions in the air (due to radon gas contributions, cosmic radiation etc). This value can be used to correct the pipe 14 measurement to give a background corrected value and hence lower detection levels for the pipe's monitoring.

The invention claimed is:

1. Apparatus for monitoring an item for radioactive material on or associated with the item, the apparatus comprising an enclosed volume, the enclosed volume including an item monitoring location and a detection location, the detection location including ion detectors, a mover of gas for providing a flow of gas past the item monitoring location to the detection location, wherein an item support system is provided at the item monitoring location, the item support system including one or more rollers.

2. Apparatus for monitoring an item for radioactive material on or associated with the item preferably according to claim 1, wherein the enclosed volume has a length extending from one end to the other, the length is considered perpendicular to a width, the length is at least 5 times the width, the item is introduced to the item monitoring location through a closeable opening and the closeable opening is provided at one end of the enclosed volume.

3. Apparatus according to claim 1 in which the item is moved to the monitoring location along its longest axis.

4. Apparatus according to claim 1 in which the middle of the support system components is lower than the ends of the support system component.

5. Apparatus according to claim 4 in which two rollers whose adjoining ends are lower than their distal ends are provided.

6. Apparatus according to claim 1 in which one or more of the rollers is powered.

7. Apparatus according to claim 1 in which the closeable opening is included in the end wall of the enclosed volume.

8. Apparatus according to claim 1 in which the closeable opening is included in at least part of the side wall of the enclosed volume.

9. Apparatus according to claim 1 in which one or more gas flow controllers are provided between a gas entrance to the enclosed volume and the item monitoring location.

10. Apparatus according to claim 9 in which a gas flow controller in the form of one or more parallel planar elements is provided, the gas flow controllers being aligned with the long axis of the apparatus.

11. Apparatus according to claim 9 in which a plurality of gas flow controllers are provided in one orientation and another plurality are provided in another orientation, the orientations being perpendicular to one another.

12. Apparatus according to claim 9 in which the gas flow controllers are in the form of hollow elements, such as tubes.

13. Apparatus according to claim 9 in which a gas flow controller is provided, the gas flow controller extending radially inward from the wall or walls defining the enclosed volume, an aperture being provided in the gas flow controller, the axis of the aperture being aligned with the axis of the item.

14. Apparatus according to claim 9 in which the one or more gas flow controllers determine the proportion of the gas flow which passes around the outside of a hollow item and/or through the item.

15. Apparatus according to claim 9 in which a gas flow controller is provided, the gas flow controller being in a form which has a first portion substantially aligned with the direction of gas flow through the inlet to the enclosed volume and a second portion substantially aligned with the axis of the enclosed volume and/or its length and/or the direction of gas flow through the enclosed volume.

16. Apparatus according to claim 15 in which the first portion and second portion are joined by a transition portion which changes alignment from one to the other.

17. Apparatus according to claim 1 in which one or more gas flow controllers are provided within the item monitoring location, the gas flow controllers being part of the support system for the item.

18. Apparatus according to claim 17 in which the gas flow controllers are in the form of one or more circular elements, such as discs, the elements or discs having a radial extent about an axis which is even in all directions in that plane, the axis being the axis of rotation of the roller.

19. A method of monitoring an item for radioactive material on or associated with the item, the method comprising: providing an enclosed volume, introducing an item through a closeable opening in one end of the chamber to provide the item at an item monitoring location; moving gas in the enclosed volume past the item monitoring location to a detection location; detecting ions in the gas using the detectors at the detecting location; wherein the item is moved to the item monitoring location on a support system including one or more rollers, the detection for ions in the medium is performed whilst the item is on the same support system.

20. A method of monitoring an item for radioactive material on or associated with the item according to claim 19, the method comprising:

providing an enclosed volume, the enclosed volume having a length extending from one end to the other, the length being considered perpendicular to a width, the length being at least 5 times the width;

introducing the item to the item monitoring location through a closeable opening provided at one end of the enclosed volume;

moving gas in the enclosed volume past the item monitoring location to a detection location;

detecting ions in the gas using the detectors at the detecting location.

21. A method according to claim 19 in which the item is an elongate item, such as a pipe, rail, I-beam or the like.

22. A method according to claim 19 in which the same item is subjected to at least two detections, between one detection and another the position of the item within the item monitoring location being changed.

23. A method according to claim 22 in which the change is provided by moving the item along the path travelled to move it to the item monitoring location.

24. A method according to claim 22 in which the change is provided by rotating the item, ideally about its axis.

25. A method according to claim 19 in which the gas flow within the enclosed volume is controller using one or more gas flow controllers.

26. A method according to claim 19 in which the enclosed volume is formed by joining a plurality of sections together, the sections including a first section having a gas inlet to the enclosed volume and a second section having a gas outlet from the enclosed volume and one or more optional third sections for linking the first section to the second section.

27. A method according to claim 19 in which gas flows from the outlet to the inlet along a return passage, the gas passing through the detection location and/or mover of gas and/or an ion filter during its flow along the return passage.

* * * * *